(12) United States Patent
Hanna

(10) Patent No.: US 6,207,921 B1
(45) Date of Patent: Mar. 27, 2001

(54) WELDING EQUIPMENT

(76) Inventor: Richard John Hanna, 26 Heesom Crescent, Churchill, Victoria 3842 (AU)

(*) Notice: Subject to any disclaimer, the term of this patent is extended or adjusted under 35 U.S.C. 154(b) by 0 days.

(21) Appl. No.: 09/250,759

(22) Filed: Feb. 16, 1999

(30) Foreign Application Priority Data

Feb. 16, 1998 (AU) .................................................. PP1824

(51) Int. Cl.⁷ .................................................. B23K 9/173
(52) U.S. Cl. ............................................. 219/74; 219/136
(58) Field of Search ..................... 219/74, 75, 136, 219/137.71

(56) References Cited

U.S. PATENT DOCUMENTS

| | | | |
|---|---|---|---|
| 3,053,968 | * | 9/1962 | Gorman et al. ......................... 219/74 |
| 3,125,666 | * | 3/1964 | Gorman et al. ......................... 219/74 |
| 3,180,967 | * | 4/1965 | Hill ........................................ 219/75 |
| 3,546,423 | * | 12/1970 | Chopp et al. .................... 219/137.71 |
| 4,275,284 | * | 6/1981 | Conley .................................... 219/74 |
| 4,788,401 | * | 11/1988 | Kleppen ................................. 219/75 |
| 5,393,949 | * | 2/1995 | Stricklen ................................ 219/74 |
| 5,556,550 | * | 9/1996 | Fyffe .................................... 219/136 |
| 5,772,102 | * | 6/1998 | New et al. .............................. 219/75 |
| 5,844,201 | | 12/1998 | Dibacco et al. . |

* cited by examiner

Primary Examiner—Clifford C. Shaw
(74) Attorney, Agent, or Firm—Baker Botts L.L.P.

(57) ABSTRACT

A welding (10) for use with gas metal arc welding wherein the welding head (10) has a diffuser body (16) with an inlet end (28) and an outlet end (38). A welding tip (14) is axially located within the diffuser body (16) and extends axially beyond the outlet end (38). The diffuser body (16) has a gas outlet (37) and a gas inlet (34), and there is at least one gas channel (36) operatively connecting the gas inlet (34) and the gas outlet (37). One or more diffusing lenses (20) are provided between the gas outlet (37) and the outlet end (38).

11 Claims, 4 Drawing Sheets

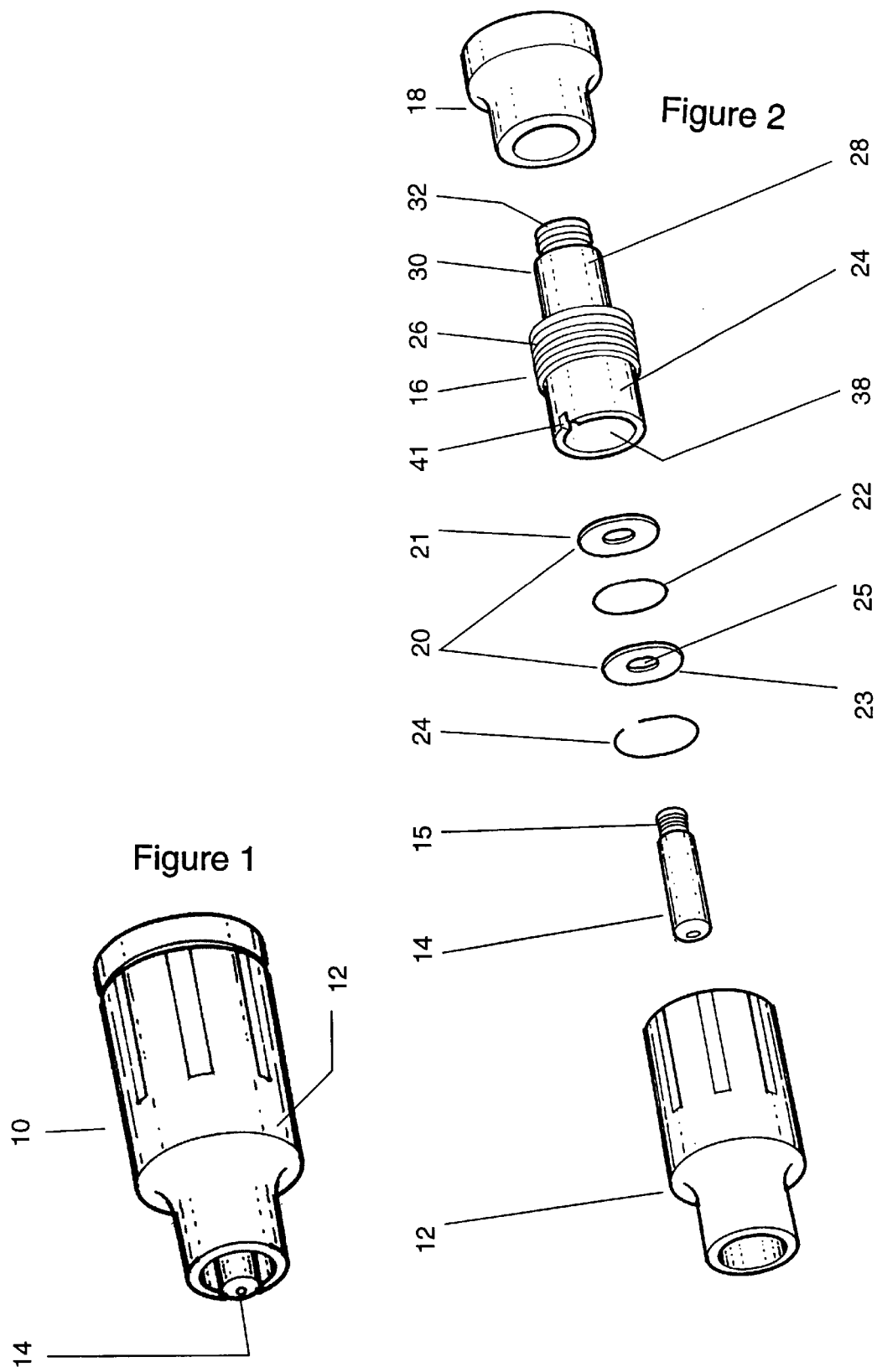

WELDING EQUIPMENT

FIELD OF THE INVENTION

This invention relates to welding equipment and refers particularly, though not exclusively, to a welding head for use with gas metal arc welding, also known as metal inert gas welding.

BACKGROUND OF THE INVENTION

With gas metal arc welding, an inert gas is passed over the welding rod during the welding process so as to eliminate oxygen from the area of the weld. The presence of oxygen deteriorates the quality of the weld, and leads to imperfections in the welding. The presence of an inert gas, such as carbon dioxide or argon, eliminates the oxygen from the site and therefore enables proper welding. Gas metal arc welding is used with material such as, for example, stainless steel.

With present equipment, a welding head is used which has radially directed outlets in the diffusion body for the gas. This creates a turbulent flow within the nozzle and thus the gas exits the nozzle in a turbulent manner. This causes the gas to encapsulate some oxygen, which can lead to small, localised faults in the welding. It can also cause spluttering and inconsistent welding performance.

The significant problem with a turbulent flow is that it makes the gas very susceptible to being deviated from its intended path by external factors such as winds, breezes, or other forms of air flow. Therefore, in many instances, large shields are placed around the welding site in an attempt to eliminate, or at least reduce, unwanted air flows to thus enable welding to continue. However, this cannot be readily achieved in many situations such as, for example, large factories, or welding in the open. Therefore, there is significant loss of gas, loss of efficiency, and loss of productive work time. This has increased the cost of such welding, and reduced the reliability of such welding, to a significant extent.

It is therefore the principle object of the present invention to provide welding equipment, particularly for use in gas metal arc welding, whereby the gas flow is more controlled and is therefore less susceptible to deviation from its intended path by air flow.

A further object of the present invention is to provide welding equipment, particularly for use with gas metal arc welding, where the gas flow is more even and less turbulent and therefore has a reduced tendency to entrap air.

SUMMARY OF THE INVENTION

With the above and other objects in mind the present invention provides a welding head for use with gas metal arc welding wherein the welding head has a diffuser body with an inlet end and an outlet end, there being a welding tip axially located within the diffuser body and extending axially beyond the outlet end, the diffuser body having a gas outlet and a gas inlet, there being at least one gas channel operatively connecting the gas inlet and the gas outlet, there being provided one or more diffusing lenses between the gas outlet and the outlet end.

Preferably, the gas channel includes a plurality of axially aligned channels arranged in a regular array around the longitudinal axis of the diffuser body. Alternatively, the gas channel is a single opening along the longitudinal axis of the diffuser body.

Preferably, the diffusing lenses are co-axial with the welding tip, the welding tip passing through a central aperture in each of the diffusing lenses.

Preferably, there are at least two diffusing lenses, separated by a spacer ring.

The diffusing lenses may be of different porosities.

DESCRIPTION OF THE DRAWINGS

In order that the invention may be fully understood there shall now be described preferred constructions of welding equipment incorporating the principle features of the present invention, the description being by way of non-limitative example only and being with reference to the accompanying illustrative drawings in which:

FIG. 1 is a front perspective view of a welding head incorporating the principle features of the present invention;

FIG. 2 is an exploded perspective view of the welding head of FIG. 1;

DESCRIPTION OF PREFERRED EMBODIMENTS

Figure 3:
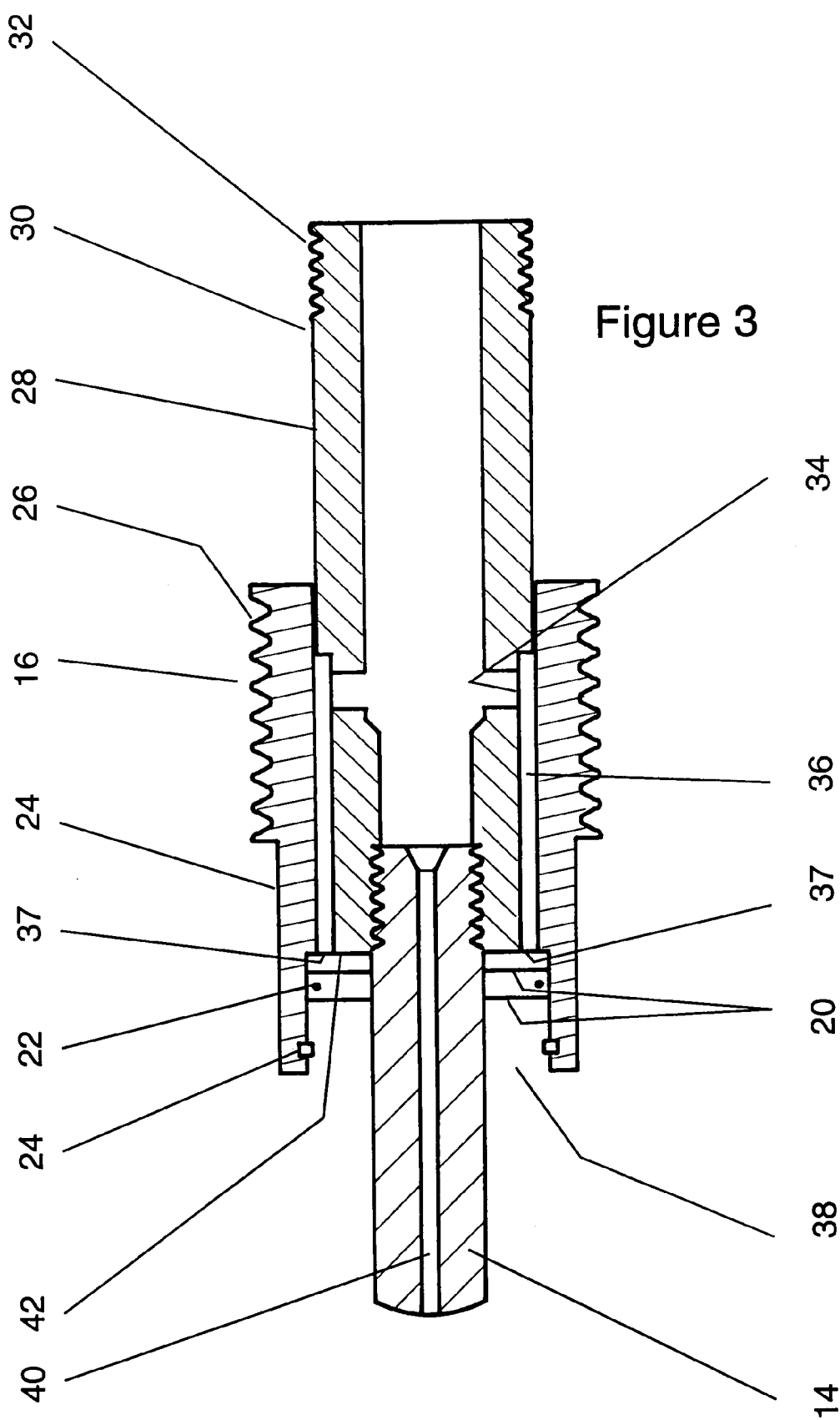
FIG. 3 is a longitudinal cross-sectional view of the welding head of FIGS. 1 and 2.
Figure 4:
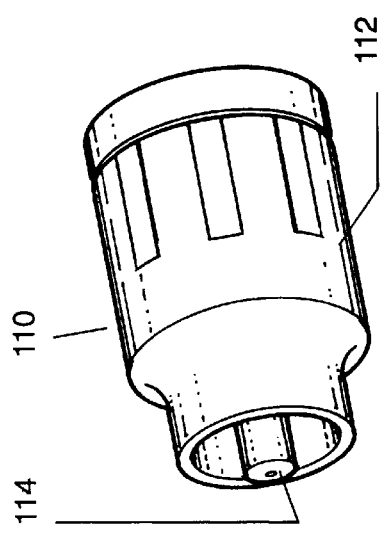
FIG. 4 is a front perspective view of a second form of welding head incorporating the principle features of the present invention.
Figure 5:
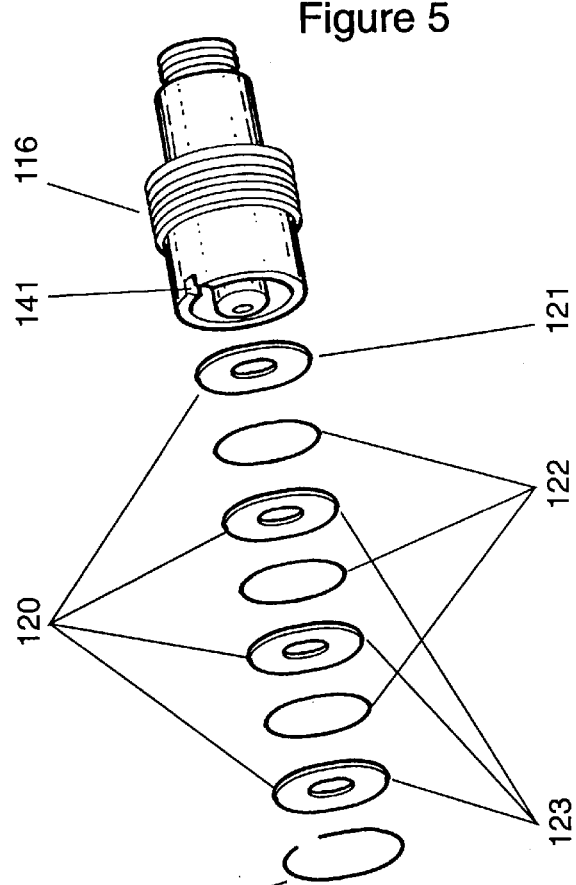
FIG. 5 is an exploded perspective view of the welding head of FIG. 4.

To firstly refer to the embodiment of FIGS. 1–3, there is shown a welding head generally designated as 10 and which has a nozzle 12, welding tip 14, diffuser body 16, gasket 18, two diffusing lenses 20, spacer 22, and circlip 24.

The diffuser body 16 is shaped somewhat like a hollow cylinder. On its external surface 24 it has a threaded portion 26. Extending rearwardly from the diffuser body 16 is the inlet end 28 which again has an outer surface 30 with a threaded portion 32. Both the portion 28 and diffuser body 16 are hollow so that an inert gas such as argon or carbon dioxide can pass thereinto and therethrough.

The inlet end 28 of diffuser body 16 has inlet ports 34 which lead to elongate channels 36 in the diffuser body 16. The inert gas can pass through the inlet 34 and into the elongate channels 36 and thereby to outlets 37. From there it can pass through the outlet end 38 of the diffuser body 16.

The welding tip 14 has a central opening 40 into which a welding rod can be located or through which a continuous welding wire may pass.

Located between outlet end 38 of diffuser body 16 and outlets 37 are a plurality, preferably two, diffuser lenses 20. A spacer 22 in the form of a thin ring is used to space the two diffusing lenses 20. A circlip 24 is used to hold the diffusing lenses 20 in position relative to the diffuser body 16. The diffusing lenses 20 are porous such that the inert gas can pass therethrough, but at a controlled rate. It is preferable that the first of the lenses 21 is of a reduced porosity compared to the second lens 23. For example, the first lens may be in the range of 50–150 microns, preferably 75–125 microns, more preferably 100 microns. The second diffusing lens 23 may be in the range 40–100 microns, preferably 50–70 microns, more preferably 60 microns. In this way, the first lens 21 creates a back-pressure in the inert gas, which can then pass through the lens 21, but through the second lens 23 more easily.

By using porous diffusing lenses 20, a multitudinous number of openings are created through which the gas passes. By virtue of the nature of those lenses, the gas flow through each of the openings in the lenses 20 resembles that of a nozzle so that the gas passes through with substantive pressure behind it, and in a clear and unified direction axially. It is not a turbulent flow. Therefore, the probability of entrapping air in the gas flow is significantly reduced. Furthermore, the susceptibility of the gas flow to diversion due to air flow is also significantly reduced.

It has been found that by using the present invention, the consumption of the inert gas may be reduced from between 50–30%. In a normal welding situation, a bottle of inert gas would normally last one day for one welder. At a cost of AU$100 per bottle, that would represent a saving of between $30 and $50 per day, per welder.

Figure 7:
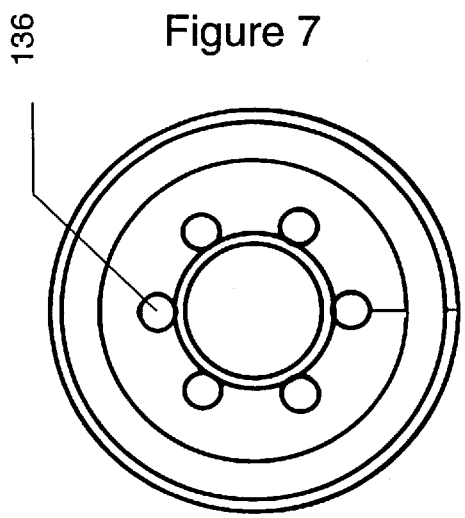
FIG. 7 is a front end view of the diffuser body of FIG. 6.
Figure 6:
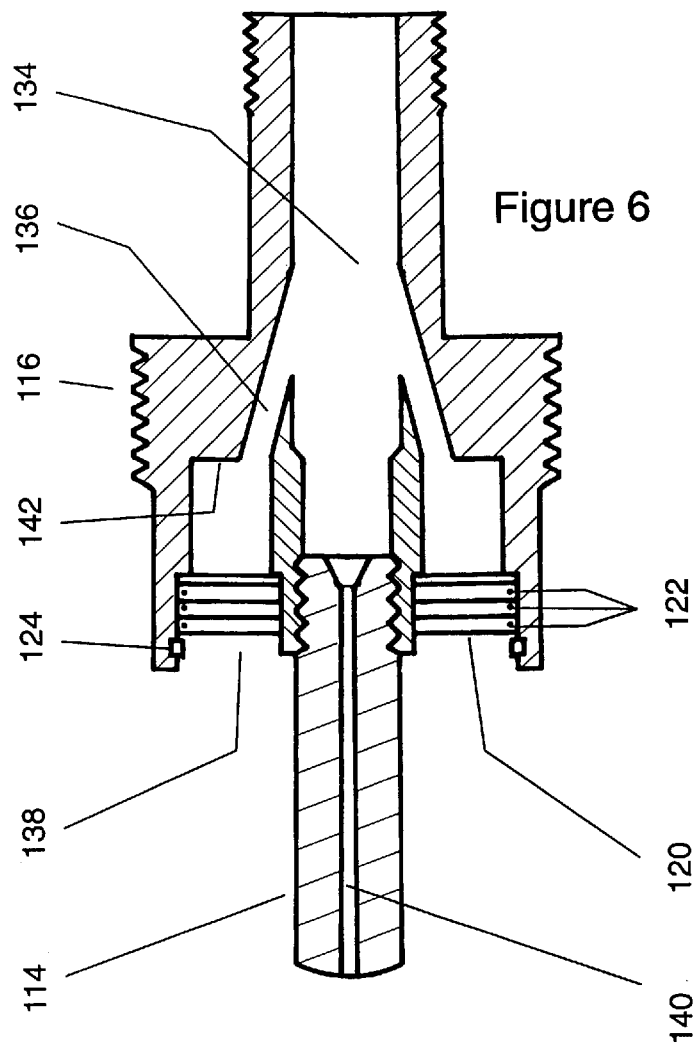
FIG. 6 is a longitudinal cross-sectional view of the diffuser body of the welding head of FIGS. 4 and 5.

As can be seen from FIG. 3, the diffuser body 16 has a face 42 in which the gas outlets 37 are located. It is preferable that the gas outlets 37 are arranged in a regular array around the longitudinal axis of the diffuser body 16. This can be seen in, for example, FIG. 7.

It is preferred that the lenses 20 be annular with a central opening 25 adapted to pass over the welding tip 14. The welding tip 14 has a threaded portion 15 which threadingly engages in the diffuser body 16, in the normal manner.

To now refer to the embodiment of FIGS. 4–7, where like components use like reference numerals but with the addition of a prefix number 1, there is shown a head 110 which has a nozzle 112, a welding tip 114, a diffuser body 116 and a gasket 118, all of these being similar to their counterparts in the embodiment of FIGS. 1–3. Again, there are provided diffusing lenses 120, although here there are four such lenses. The lenses may all be the same, or may be different. The first lens 121 may be of reduced porosity to the remaining lenses 123. The remaining lenses 123 may be all different, or may be all the same. Again, spacers 122 are used to separate the lenses 120. Furthermore, a circlip 124 is used to hold them in position.

Here, the gas channels 136 are arranged in a regular way around the longitudinal axis of diffuser body 116, but are somewhat longitudinally and radially outwardly from a central inlet 134. In this way, the gas flows from inlet 134, through channels 136 and outlets 137, and then through the outlet end 138 of diffuser body 116. That flow is essentially axial. Therefore, there is a reduced tendency for there to be turbulent flow before the gas contacts the lenses 120. By virtue of the nature of the lenses 120, the gas flow becomes almost entirely axial and therefore non-turbulent. As such, it will pass along the welding rod to the welding site. Therefore, there will be less tendency to entrap air and the efficiency of welding will be increased. By virtue of the more concentrated form of gas flow, and the higher pressure behind the gas flow due to the buildup in pressure caused by the lenses 120 the tendency of the gas flow to be displaced due to air flow will be significantly reduced. Efficiencies in accordance with the embodiments of FIGS. 1–3 have again been realised with this embodiment.

In trials it has been found that splatter and the like may be reduced. The splatter may cause damage to lenses 20, 120 but they can easily be replaced after removing circlip 24, 124. A notch 41, 141 at outlet end 38, 138 is provided to assist in removing the circlip 24 124. More than one notch 41, 141 may be provided. Further, due to the reduced air in the gas flow, the colour of the weld (particularly with stainless steel) may be noticeably improved.

It will be understood that the invention disclosed and defined herein extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

The claims defining the invention are as follows:

1. A welding head, comprising:

a diffuser body with an inlet end and an outlet end;

a welding tip axially located within the diffuser body and extending axially beyond the outlet end, the diffuser body having a gas outlet and a gas inlet, wherein at least one gas channel operatively connects the gas inlet and the gas outlet, and wherein the welding tip is adapted to be used for gas metal arc welding; and at least two diffusing lenses provided between the gas outlet and the outlet end of the diffuser body,
      wherein the diffusing lenses are coaxial with the welding tip which passes through a central aperture in each of the diffusing lenses, and
      wherein a first lens of the diffusing lenses has a porosity in the range of about 50 to about 150 microns, and a second lens of the diffusing lenses has a porosity in the range of about 40 to about 100 microns.

2. A welding head according to claim 1, wherein the gas channel includes a plurality of axially aligned channels arranged in a regular array around the longitudinal axis of the diffuser body.

3. A welding head according to claim 1, wherein the gas channel is a single opening along the longitudinal axis of the diffuser body.

4. A welding head according to claim 1, wherein the diffusing lenses, are separated by a spacer ring.

5. A welding head according to claim 4, wherein the first lens is in the range of 75 to 125 microns, and the second lens is in the range of 50 to 70 microns.

6. A welding head according to claim 5, wherein the first lens is 100 microns and the second lens is 60 microns.

7. A welding head according to claim 6, wherein the first lens is adjacent the gas outlet and the second lens is adjacent the outlet end.

8. A welding head according to claim 5, wherein the first lens is adjacent the gas outlet and the second lens is adjacent the outlet end.

9. A welding head according to claim 4, wherein the first lens is adjacent the gas outlet, and the second lens is adjacent the outlet end.

10. A welding head according to claim 1, wherein the welding tip includes a bore to receive a welding metal there through.

11. A welding head according to claim 1, wherein the one or more diffusing lenses are composed of a porous material.

* * * * *

UNITED STATES PATENT AND TRADEMARK OFFICE
CERTIFICATE OF CORRECTION

PATENT NO.    : 6,207,921 B1
DATED         : March 27, 2001
INVENTOR(S)   : Richard John Hanna Page 1 of 1

It is certified that error appears in the above-identified patent and that said Letters Patent is hereby corrected as shown below:

<u>Column 4,</u>
Line 39, "lenses," should read -- lenses --
Line 45, "microns" should read -- microns, --
Line 46, "claim 6," should read -- claim 4, --

Signed and Sealed this

Tenth Day of September, 2002

*Attest:*

*Attesting Officer*

JAMES E. ROGAN
*Director of the United States Patent and Trademark Office*